United States Patent
Qaddoura (10) Patent No.: US 9,379,993 B1
(45) Date of Patent: Jun. 28, 2016

(54) NETWORK CONTROL PROTOCOL

(71) Applicant: Amazon Technologies, Inc., Reno, NV (US)

(72) Inventor: Fareed Adib Qaddoura, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 13/966,988

(22) Filed: Aug. 14, 2013

(51) Int. Cl.
*G06F 15/16* (2006.01)
*H04L 12/873* (2013.01)

(52) U.S. Cl.
CPC .................................. *H04L 47/528* (2013.01)

(58) Field of Classification Search
CPC ......... H04L 43/00; H04L 43/16; H04L 43/08; H04L 43/0829; H04L 43/0864; H04L 43/087; H04L 43/50; H04L 1/22; H04J 3/14; H04J 3/0605; H04J 3/062; H04J 3/1611

USPC ................................... 709/230, 237; 370/465
See application file for complete search history.

(56) References Cited

U.S. PATENT DOCUMENTS

| | | | | |
|---|---|---|---|---|
| 7,764,693 | B2 * | 7/2010 | Sakata | 370/394 |
| 8,125,907 | B2 * | 2/2012 | Averi et al. | 370/232 |
| 8,289,845 | B1 * | 10/2012 | Baldonado et al. | 370/230 |
| 2006/0250965 | A1 * | 11/2006 | Irwin | 370/238 |
| 2008/0304472 | A1 * | 12/2008 | Gourlay et al. | 370/352 |
| 2010/0097931 | A1 * | 4/2010 | Mustafa | 370/235 |
| 2010/0208613 | A1 * | 8/2010 | Oba et al. | 370/253 |
| 2011/0096676 | A1 * | 4/2011 | Krzanowski | 370/252 |

* cited by examiner

*Primary Examiner* — Cheikh Ndiaye
(74) *Attorney, Agent, or Firm* — Thomas | Horstemeyer, LLP (57) ABSTRACT

Disclosed are various embodiments for a network control application. Duplicate packets are simultaneously communicated across dedicated network communications paths. A receiving network access device detects a lagging network communications path. Packets received from the network communications path which is not lagging is communicated to a destination address while the duplicate is discarded.

20 Claims, 4 Drawing Sheets

NETWORK CONTROL PROTOCOL

BACKGROUND

Multiple dedicated network connections may be used to connect endpoints in a wide area network. One direct network connection may be designated for network communications until a fault in the dedicated network connection occurs. Another of the dedicated network connections may then be designated for network communications. This transition may result in communication downtime, computational overhead, and other effects.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Two endpoints in a wide area network may be connected by multiple dedicated network connections for redundancy. For example, the endpoints may be connected by a circuit switched network connection, a direct network connection, or another connection. One of the dedicated network connections may be designated to handle the network communications between the two endpoints. In the event of a slowdown or termination of the designated network connection, the two endpoints may then switch to using another of the dedicated network connections for network communications. This transition may result in a brief period of downtime until the newly designated network connection is fully operational in handling the network traffic. Additionally, computational and time overhead may be required in reassigning socket connections, network addresses, or other network resources, or making other configuration changes to account for the newly designated network connection.

A network control application implementing a network control protocol may simultaneously communicate network traffic across each of the dedicated network communications paths. Sequence numbers may be assigned to packets sent across the dedicated network communications paths to determine which dedicated network communications path is operating with greater bandwidth. The packets obtained from the dedicated network communications path with the greater bandwidth are allowed to egress and are communicated to their destination address. Aggregated performance data may be used to generate reports on network functionality. Alarms or other notifications may also be sent to communications providers of the dedicated network communications paths in the event of observable performance degradation.

In the following discussion, a general description of the system and its components is provided, followed by a discussion of the operation of the same.

Figure 1:
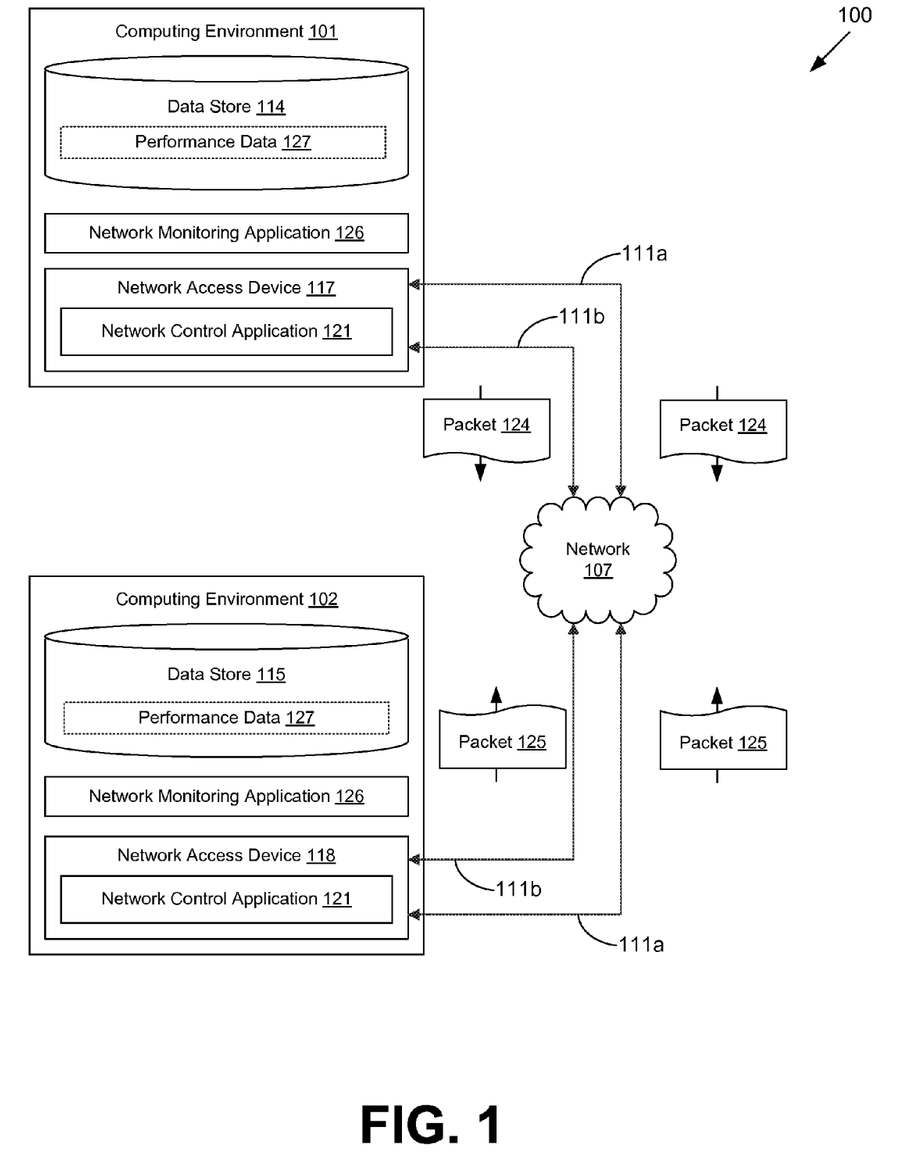
FIG. 1 is a drawing of a networked environment according to various embodiments of the present disclosure.

With reference to FIG. 1, shown is a networked environment 100 according to various embodiments. The networked environment 100 includes a computing environment 101 and a computing environment 102, which are in data communication with each other via a network 107 by network communications paths 111a and 111b. The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. The network communications paths 111a/b each comprise a predefined dedicated path for network 107 communications between the computing environments 101 and 102. Such network communications paths 111a/b may comprise, for example, circuit switched network paths, direct network connections, or other predefined dedicated paths for network 107 communications as can be appreciated. Although the networked environment 100 depicts two network communications paths 111a/b, it is understood that the foregoing discussion may be applied to additional network communications paths 111a/b.

The computing environments 101 and 102 may each comprise, for example, a server computer or any other system providing computing capability. Alternatively, the computing environments 101 and 102 may each employ a plurality of computing devices that may be arranged, for example, in one or more server banks or computer banks or other arrangements. Such computing devices may be located in a single installation or may be distributed among many different geographical locations. For example, the computing environments 101 and 102 may each include a plurality of computing devices that together may comprise a hosted computing resource, a grid computing resource and/or any other distributed computing arrangement. In some cases, the computing environments 101 and 102 may each correspond to an elastic computing resource where the allotted capacity of processing, network, storage, or other computing-related resources may vary over time.

Various applications and/or other functionality may be executed in the computing environments 101 and 102 according to various embodiments. Also, various data is stored in data stores 114 and 115 that are accessible to the computing environments 101 and 102, respectively. The data stores 114 and 115 may be representative of a plurality of data stores 114 and 115 as can be appreciated. The data stored in the data store 114 and 115, for example, is associated with the operation of the various applications and/or functional entities described below.

The computing environments 101 and 102 include network access devices 117 and 118, respectively, to facilitate the connection of the respective computing environments 101 or 102 to the network 107 via the network communications paths 111a/b. Network access devices 117 and 118 may comprise, for example, routers, switches, aggregation routers, wireless access points, or other network access devices 117 and 118 as can be appreciated. Network access devices 117 and 118 may be in data communication with other components of the respective computing environments 101 or 102 such as computing devices, data stores 114 or 115, or other components.

The network control application 121, implemented in each of the computing environments 101 and 102, is executed to facilitate the communication of network 107 traffic between components of the computing environments 101 and 102 via the network 107. Although the network control application 121 is shown as being implemented in network access devices 117 and 118, it is understood that the network control application 121 may also be implemented in computing devices distinct from the network access devices 117 and 118, or other functionality of the computing environments 101 and 102. To this end, the network control application 121 is configured to monitor the performance of the network communications paths 111a/b. The network control application 121 allows packets 124 or 125 communicated by the network communications path 111a/b having the greatest bandwidth, speed, or other performance metric to egress by communicating the respective packet 124 or 125 to the respective destination address in the computing environment 101 or 102. Packets 124 or 125 comprise a data unit communicated between the computing environments 101 and 102 via the network 107.

The network monitoring application 126, implemented in each of the computing environments 101 and 102, is executed to communicate alerts to service providers of network communications paths 111a/b as will be discussed below. Service providers may comprise, for example, internet service providers, telecommunications companies, utility companies, or other service providers. The network monitoring application 126 may also generate reports based on the performance of network communications paths 111a/b using performance data 127 aggregated by the network control application 121 as will be described below.

The data stored in the data store 114 and 115 includes, for example, performance data 127 logged or aggregated over a period of time, and potentially other data. Performance data 127 embodies various data points corresponding to the performance of network communications paths 111a/b including speed, bandwidth, round trip time, or other data.

Next, a general description of the operation of the various components of the networked environment 100 is provided. To begin, the instance of the network control application 121 executed in the network access device 117 begins a handshake with the instance of the network control application 121 executed in the network access device 118. This may comprise, for example, exchanging a sequence seed between the network access devices 117 and 118. The sequence seed comprises a base sequence number from which a sequence is generated, allowing a sequence number to be assigned to a packet 124 or 125 as will be described further. The handshake may also comprise communicating a plurality of test packets 124 or 125 between the network access devices 117 to determine data communication times corresponding to the network communications paths 111a/b. The data communication times may comprise, for example, a one way trip time or a round trip time. Additionally, the data communication times may comprise a minimum, maximum, average, or other aggregate data communication time. The data communication times calculated by the communication of test packets 124 or 125 may be stored as performance data 127.

After completing the handshake between the network access devices 117 and 118, the network access devices 117 and 118 initiate data communication between the computing environments 101 and 102 via the network 107. This comprises communicating identical or substantially identical versions of packets 124 or 125 across the network communications paths 111a/b. For example, an application or other component of the computing environment 101 may generate a packet 124 for communication to the computing environment 102. The network control application 121 would generate a duplicate or substantially duplicate version of the packet 124 for communication across both the network communications path 111a and network communications path 111b. Similarly, an instance of the network control application 121 executed in the network access device 118 may duplicate packets 125 for communication across the network communications paths 111a/b to the computing environment 101.

The network control application 121 may include headers, metadata, or other data in a packet 124 or 125 which includes a sequence number. The sequence number is generated as a function of the sequence seed exchanged between network access devices 117 and 118. For example, the sequence number may be generated by incrementing or otherwise applying an operation to the sequence seed or a previously generated sequence number to generate a new sequence number. The sequence number may also be generated as a function of other data included in the packet 124 or 125, such as payload data or other data. The sequence number may also be generated as a function of other data.

Upon receipt of a packet 124 or 125 at a network access device 117 or 118, the network control application 121 detects if a network communications path 111a/b is lagging as a function of the sequence numbers. A lagging network communications path 111a/b may have a lower bandwidth or speed. The lagging network communications path 111a/b may also be subject to interference or fault which results in a delayed delivery of a packet 124 or 125.

Detecting a lagging network communications path 111a/b may comprise comparing a sequence number of packets 124 or 125. For example, an instance of the network control application 121 executed in the network access device 117 may compare the sequence number of a packet 125 received via the network communications path 111a to the sequence number of a packet 125 received via the network communications path 111b. The packets 125 to be compared may comprise the packets 125 most recently received via the respective network communications path 111a/b, or other packets 125.

A lagging network communications path 111a/b may correspond to the network communications path 111a/b from which a sequentially lesser of the compared packets 124 or 125 was received. In other embodiments, a lagging network communications path 111a/b may correspond to the network communications path 111a/b from which a sequentially lesser of the compared packets 124 or 125 was received responsive to the sequential difference between the compared packets 124 or 125 meeting or exceeding a threshold. A threshold may comprise a number of packets 124 or 125 by which a sequentially greater of the compared packets 124 or 125 must exceed the sequentially lesser of the compared packets 124 or 125, or another threshold.

For example, an instance of the network control application 121 executed in the network access device 117 may compare packets 125 received via the network communications paths 111a/b, and a threshold may comprise two packets 125. A network communications path 111a/b may be detected as lagging responsive to the most recently received packet 125 being two packets behind the most recently received packet 125 of the other network communications path 111a/b.

In some embodiments, the threshold may comprise a predefined threshold. In other embodiments, the threshold may be calculated by the network control application 121. For example, during the communication of test packets 124 or 125 discussed above, the network control application 121 may increment the threshold responsive to compared packets 124 or 125 meeting or exceeding the threshold. The threshold may then be incremented until reaching a predefined upper boundary threshold. The upper boundary threshold may comprise an average threshold value calculated as a function of previously generated thresholds, a predefined upper boundary threshold, an upper boundary threshold calculated as a function of an average data transmission time, or another upper boundary. A lagging network communications path 111a/b may also be detected by another approach.

In some embodiments, after detecting a lagging network communications path 111a/b, the network control application 121 may communicate with the network monitoring application 126 to communicate an alert to a service provider corresponding to the lagging network communications path 111a/b. The alert may comprise an email notification, a short message service (SMS) message, a telephone communication, a social messaging service message, or another alert as can be appreciated.

In some embodiments, the network control application 121 determines a lagging network communications path 111a/b at a predefined time interval, after receiving an interval of a predefined number of packets 124 or 125, or responsive to some other criteria. In such an embodiment, the network control application 121 may allow a packet 124 or 125 obtained by the network communications path 111a/b last determined to not be lagging. Other criteria may also be used to determine which packets 124 or 125 may egress.

After determining that a network communications path 111a/b is lagging, the network control application 121 may detect that the network communications path 111a/b is no longer lagging per the previously discussed criteria. In such an embodiment, the network control application 121 may repeat the handshake operation and sequence seed exchange as discussed above, or perform another operation.

After receiving packets 124 or 125 via the network communications paths 111a/b, the network control application 121 then allows one of the duplicated packets 124 or 125 to egress by communicating the packet 124 or 125 to a destination network address in the respective computing environment 101 or 102. In some embodiments, the packet 124 or 125 comprises the packet 124 or 125 received via the network communications path 111a/b not detected as being lagging. In other embodiments, the packet 124 or 125 comprises packet 124 or 125 received by a preselected or predetermined network communications path 111a/b. The corresponding duplicate packet 124 or 125 which does not egress is then discarded.

For example, the network control application 121 executed in the network access device 117 may communicate a packet 125 to a network address such as a local area network address, socket or port number, hardware network address, or other address.

Additionally, in some embodiments, the network control application 121 may calculate round trip times, pings, latencies, bandwidth, and other performance metrics and save them as performance data 127. The network monitoring application 126 may then be configured to generate reports or visualizations embodying the performance of network communications paths 111a/b, or other data.

Figure 2:
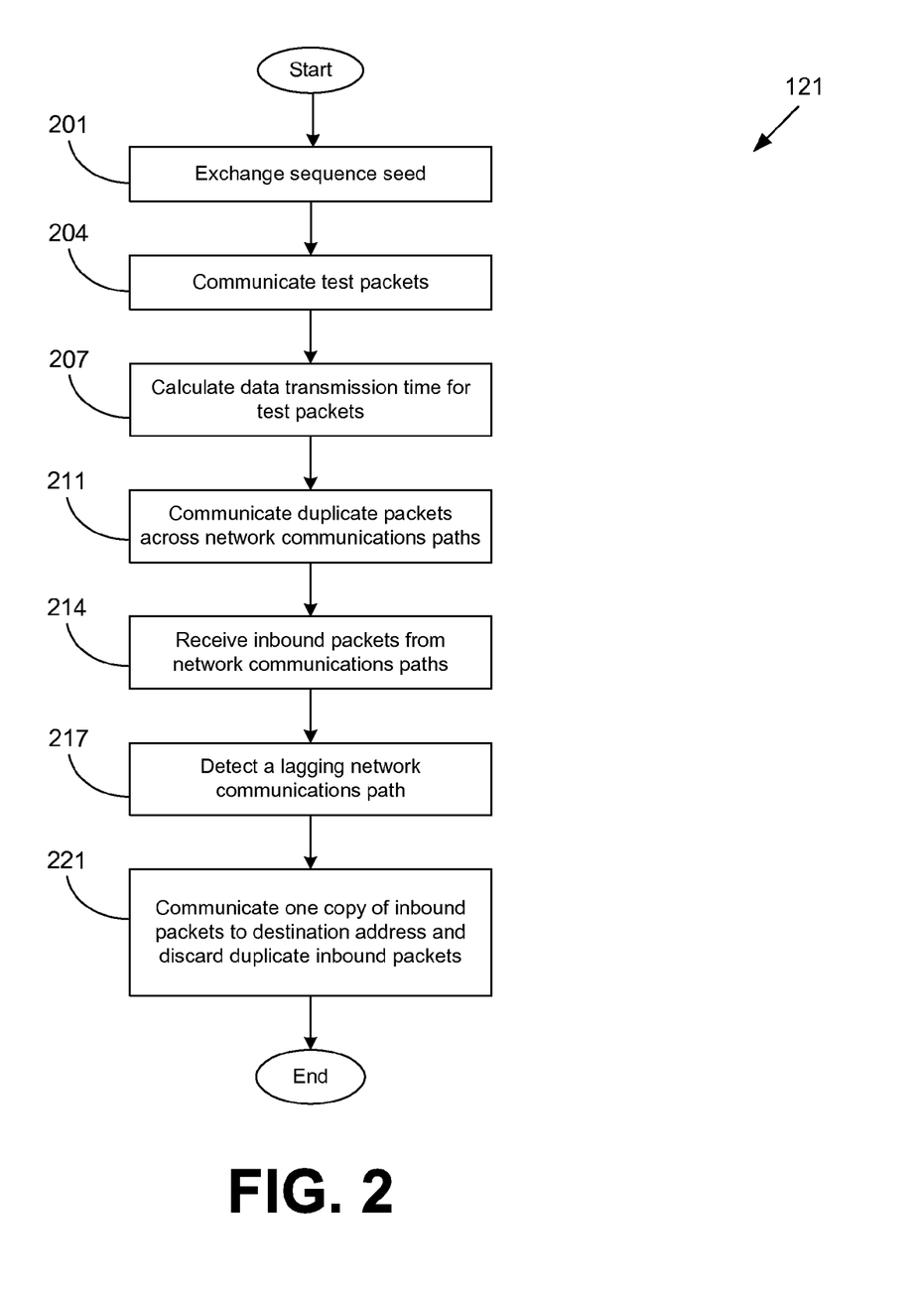
FIGS. 2 and 3 are flowcharts illustrating one example of functionality implemented as portions of a network control application executed in a computing environment in the networked environment of FIG. 1 according to various embodiments of the present disclosure.

Referring next to FIG. 2, shown is a flowchart that provides one example of the operation of a portion of the network control application 121 executed in a network access device 117 (FIG. 1) implemented in the computing environment 101 (FIG. 1) according to various embodiments. It is understood that the flowchart of FIG. 2 provides merely an example of the many different types of functional arrangements that may be employed to implement the operation of the portion of the network control application 121 as described herein. As an alternative, the flowchart of FIG. 2 may be viewed as depicting an example of elements of a method implemented in the computing environment 101 according to one or more embodiments.

Beginning with box 201, the network control application 121 exchanges a sequence seed with another instance of the network control application 121 executed in a network access device 118 (FIG. 1) implemented in the computing environment 102 (FIG. 1). In some embodiments, this comprises performing a handshake operation with the sequence seed between the instances of the network control application 121 executed in the network access devices 117 and 118. In other embodiments, this comprises communicating a sequence seed to the network control application 121 executed in the network access device 118. In further embodiments, this comprises receiving a sequence seed from the network control application 121 executed in the network access device 118.

The sequence seed may be exchanged one of the network communications paths 111a (FIG. 1) or 111b (FIG. 1) or communicated by both network communications paths 111a/b. The sequence seed may also be exchanged by another approach.

Next, in box 204, the network control application 121 communicates test packets 124 (FIG. 1) to the network access device 118 via the network communications paths 111a/b. In box 207, the network control application 121 calculates data transmission times for the test packets 124. This may comprise, for example, calculating a round trip time for a test packet 124 and an acknowledgement packet 125 (FIG. 1) communicated from the computing environment 102. The data transmission times may comprise an average data transmission time, a minimum or maximum data transmission time, or another aggregate data transmission time.

In box 211, after calculating the data transmission times for the test packets 124, the network control application 121 duplicates packets 124 generated from functionality executed in the computing environment 101 and communicates the duplicate packets 124 across network communications paths 111a/b. In box 214, the network control application 121 receives inbound packets 125 via the network communications paths 111a/b from the network access device 118.

After receiving inbound packets 125, the network control application 121 detects if one of the network communications paths 111a/b is lagging with respect to the other network communications path 111a/b. This may comprise calculating a sequence lag comprising a difference in sequence indices corresponding to the packets 125 most recently received by respective network communications paths 111a/b. A network communications path 111a/b may then be detected as lagging responsive to the sequence lag meeting or exceeding a threshold.

In other embodiments, a network communications path 111a/b may be detected as lagging responsive to the sequence lag meeting or exceeding a threshold for a predefined number of consecutive instances. For example, a network communications path 111a may be detected as lagging if the sequence lag meets or exceeds a threshold for two or more consecutive instances of sampling sequence numbers. Lagging network communications paths 111a/b may also be detected by another approach.

Next, in box 221, the network control application 121 communicates to a destination address one copy of inbound packets 125 received via one of the network communications paths 111a/b, and discarding or deleting the duplicate inbound packets 125 received via the other network communications path 111a/b. For example, the network control application 121 may discard packets 125 received via a lagging network communications path 111a/b and communicate packets 125 received via a non-lagging network communications path 111a/b to a destination network address in the computing environment 101. As another example, the network control application 121 may communicate packets 125 received via a predefined or previously designated network communications path 111a/b while discarding the duplicate packets 125 received via the other network communications path 111a/b. Packets 125 may also be communicated to a destination address by another approach.

Figure 3:
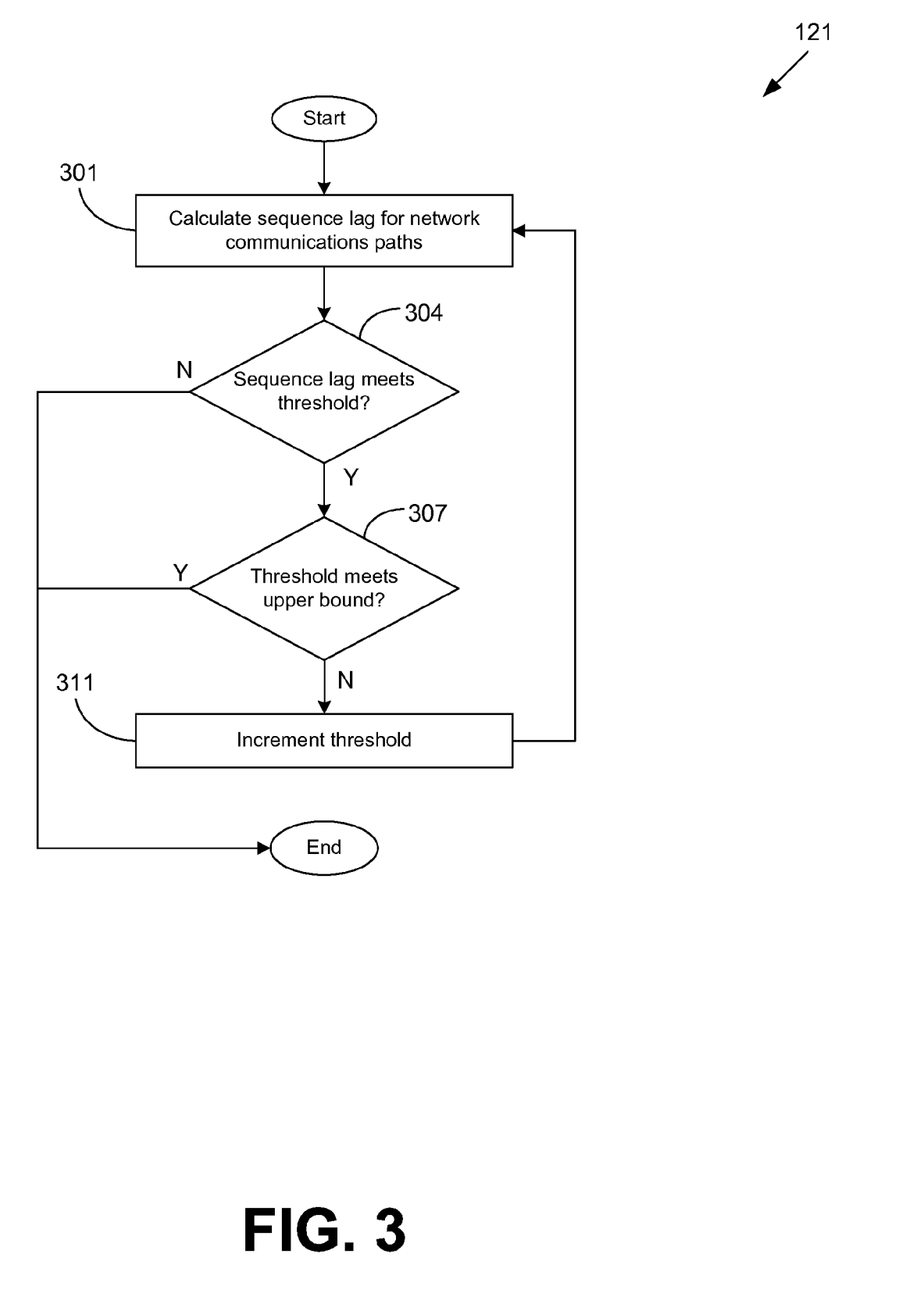

Referring next to FIG. 3, shown is a flowchart that provides one example of the operation of a portion of the network control application 121 executed in a network access device 117 (FIG. 1) implemented in the computing environment 101 (FIG. 1) according to various embodiments. It is understood that the flowchart of FIG. 3 provides merely an example of the many different types of functional arrangements that may be employed to implement the operation of the portion of the network control application 121 as described herein. As an alternative, the flowchart of FIG. 3 may be viewed as depicting an example of elements of a method implemented in the computing environment 101 according to one or more embodiments.

Beginning with box 301, the network control application 121 calculates a sequence lag for network communications paths 111a (FIG. 1) and 111b (FIG. 1). This may comprise, for example, obtaining packets 125 (FIG. 1) from network communications paths 111a/b communicated by a network access device 118 (FIG. 1) via the network 107 (FIG. 1). The packets 125 may comprise packets 125 generated by functionality executed in the computing environment 102 (FIG. 1). The packets 125 may also comprise test packets 125 generated by another instance of the network control application 121 executed in the network access device 118. Calculating a sequence lag may then comprise calculating a difference in sequence indices for the packets 125 most recently received via respective network communications paths 111a/b. The sequence lag may also be calculated by another approach.

In box 304, the network control application 121 determines if the sequence lag meets a threshold. If the sequence lag does not meet the threshold, the process ends. Otherwise, the process moves to box 307 where the network control application 121 determines if the threshold meets a defined upper bound. The upper bound may comprise a predefined upper bound. The upper bound may also comprise an upper bound dynamically calculated as a function of previously calculated upper bounds, calculated as a function of an average lag or time to travel calculated with respect to network communications paths 111a/b, or other data. If the threshold meets the upper bound, the process ends. Otherwise, the threshold is incremented in box 311. The threshold may be incremented by a predefined interval, increased to a defined or dynamically calculated value, or incremented by another approach. After incrementing the threshold, the process returns to box 301 where the sequence lag is recalculated.

Figure 4:
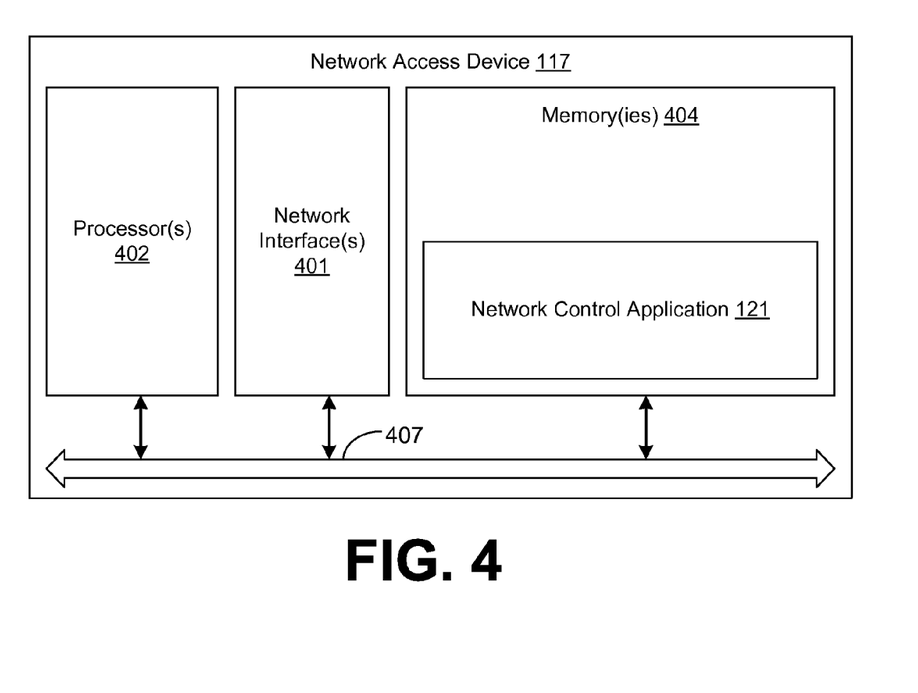
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more network access devices 117. Each network access device 117 includes at least one processor circuit, for example, having a processor 402 and a memory 404, both of which are coupled to a local interface 407. Also connected to the local interface 407 is a network interface 408 to facilitate a connection between the network access device 117 and a network 107 (FIG. 1). The network interface 408 may comprise, for example, an Ethernet port, a serial port, a cable connection, modem, phone connection, or other component of a network 107 connection. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a network control application 121, and potentially other applications. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the network control application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the network control application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network control application 121, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network control application 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device such as a network access device 117, or in multiple computing devices in the same computing environment 101. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first at least one computing device, the program, when executed, causing the first at least one computing device to at least:

calculate an average data transmission time between the first at least one computing device and a second at least one computing device based at least in part on a plurality of test data packets, the first at least one computing device and the second at least one computing device being connected via a first dedicated circuit switched network path and a second dedicated circuit switched network path;

exchange, with the second at least one computing device, a handshake data comprising a sequence seed and the average data transmission time;

communicate, to the second at least one computing device, a plurality of outbound data packets having a first sequence number based at least in part on the sequence seed, the outbound data packets being duplicated across the first dedicated circuit switched network path and the second dedicated circuit switched network path;

obtain, from the second at least one computing device, a plurality of inbound data packets corresponding to a plurality of second sequence numbers across the first dedicated circuit switched network path and the second dedicated circuit switch network path;

select, from the first dedicated circuit switched network path and the second dedicated circuit switched network path, a dedicated circuit switched network path having a greater bandwidth as a function of a sequence lag of the second sequence numbers meeting a threshold;

communicate, to a destination address, those of the inbound data packets obtained via the dedicated circuit switched network path having the greater bandwidth, and discard others of the inbound data packets obtained via the other dedicated circuit switched network path.

2. The non-transitory computer-readable medium of claim 1, wherein the program further causes the first at least one computing device to at least:

calculate the sequence lag; and repeat, after the calculating, exchanging of the handshake data responsive to the sequence lag falling below the threshold.

3. A system, comprising:

a first at least one computing device in network communication with a second at least one computing device via a plurality of dedicated circuit switched network paths, the first at least one computing device configured to at least:

exchange, with the second at least one computing device, a handshake data comprising a sequence seed and at least one data transmission time between the first at least one computing device and the second at least one computing device;

communicate, to the second at least one computing device, a plurality of outbound data units having a first sequence number based at least in part on the sequence seed, the outbound data units being duplicated across each of the dedicated circuit switched network paths;

obtain, from the second at least one computing device, across the plurality of dedicated circuit switched network paths, a plurality of inbound data units having a second sequence number;

determine a one of the dedicated circuit switched network paths having a greatest bandwidth as a function of a sequence lag of the second sequence number meeting a threshold; and communicate to a destination address those of the inbound data units obtained via the one of the dedicated circuit switched network paths having the greatest bandwidth, and discard others of the inbound data units obtained via the other dedicated circuit switched network path.

4. The system of claim 3, wherein the first at least one computing device is further configured to at least cache at least a portion of the inbound data units.

5. The system of claim 4, wherein the sequence seed comprises a time stamp or a predefined value.

6. The system of claim 4, wherein the sequence seed is based at least in part on a content of the handshake data.

7. The system of claim 4, wherein the first at least one computing device is further configured to at least:

generate a plurality of test data units;

communicate the test data units to the second at least one computing device;

calculate a plurality of test data transmission times between the first at least one computing device and the second at least one computing device; and wherein the at least one data transmission time comprises an average of the test data transmission times.

8. The system of claim 3, wherein determining the one of the dedicated circuit switched network paths having the greatest bandwidth comprises:

calculate the sequence lag with respect to a first one of the dedicated circuit switched network paths and a second one of the dedicated circuit switched network paths as a function of the second sequence number of a respective ones of the inbound data units; and select, responsive to the sequence lag meeting the threshold, the one of the dedicated circuit switched network paths having the greatest bandwidth as a one of the dedicated circuit switched network paths from which a sequentially greater one of the inbound data units was obtained.

9. The system of claim 8, wherein the first at least one computing device is further configured to at least communicate, responsive to the sequence lag meeting the threshold, an alert to a communications provider of one of the dedicated circuit switched network paths other than the one of the dedicated circuit switched network paths having the greatest bandwidth.

10. The system of claim 8, wherein the threshold comprises a number of input data units.

11. The system of claim 8, wherein the sequence lag is a first sequence lag, and the first at least one computing device is further configured to at least:

define the threshold as an initial threshold value;

calculate a second sequence lag with respect to the first one of the dedicated circuit switched network paths and the second one of the dedicated circuit switched network paths;

increase the threshold by a predefined interval; and wherein the calculating and the increasing are performed until the second sequence lag is less than the threshold or the threshold meets a maximum threshold value.

12. The system of claim 11, wherein the maximum threshold value is based at least in part on an average data transmission time or an average threshold value.

13. The system of claim 8, wherein the first at least one computing device is further configured to at least:

store the sequence lag or the data transmission time as a portion of an aggregated performance data associated with the dedicated circuit switched network paths; and generate a report embodying the aggregated performance data.

14. The system of claim 8, wherein the first at least one computing device is further configured to at least:

recalculate the sequence lag; and repeat the exchanging of the handshake data responsive to the sequence lag falling below the threshold.

15. A method, comprising:

communicating, by a first computing device, a plurality of test data packets to a second computing device, the first computing device and the second computing device being in network communication via a first dedicated circuit switched network path and a second dedicated circuit switched network path;

calculating, by the first computing device, an average data transmission time between the first computing device and the second computing device based at least in part on the communicating;

exchanging, by the first computing device, with the second computing device, a handshake data comprising a sequence seed and the average data transmission time;

communicating, by the first computing device, to the second computing device, a plurality of outbound data packets having a first sequence number based at least in part on the sequence seed, the outbound data packets being duplicated across the first dedicated circuit switched network path and the second dedicated circuit switched network path;

obtaining, by the first computing device, from the second computing device, across the first dedicated circuit switched network path and the second dedicated circuit switched network path, a plurality of inbound data packets corresponding to a plurality of second sequence numbers;

selecting, by the first computing device, from the first dedicated circuit switched network path and the second dedicated circuit switched network path, a dedicated circuit switched network path having a greater bandwidth as a function of a sequence lag of the second sequence numbers meeting a threshold; and communicating, by the first computing device, to a destination address, those of the inbound data packets obtained via the dedicated circuit switched network path having the greater bandwidth, and discarding others of the inbound data packets obtained via the other dedicated circuit switched network path.

16. The method of claim 15, further comprising:

calculating, by the first computing device, the sequence lag with respect to the first dedicated circuit switched network path and the second dedicated circuit switched network path as a function of the second sequence numbers;

determining, responsive to the sequence lag meeting the threshold, by the first computing device, a sequentially greatest of the inbound data packets; and selecting, by the first computing device, the dedicated circuit switched network path having the greater bandwidth as corresponding to the sequentially greatest of the inbound data packets.

17. The method of claim 15, further comprising communicating, by the first computing device, responsive to the sequence lag meeting the threshold, an alert to a communications provider of one of the first dedicated circuit switched network path or the second dedicated circuit switched network path having a lesser bandwidth.

18. The method of claim 15, wherein the sequence lag is a first sequence lag, and the method further comprises:

defining, by the first computing device, the threshold as an initial threshold value;

calculating, by the first computing device, a second sequence lag with respect to the first dedicated circuit switched network path and the second dedicated circuit switched network path;

increasing, by the first computing device, the threshold by a predefined interval; and wherein the calculating and the increasing are performed until the second sequence lag is less than the threshold or the threshold meets a maximum threshold value.

19. The method of claim 15, further comprising:
recalculating the sequence lag; and
repeating the exchanging of the handshake data responsive to the sequence lag falling below the threshold.

20. The method of claim 15, further comprising caching, by the first computing device, at least a portion of the inbound data packets.

* * * * *